(12) United States Patent
Brown et al.

(10) Patent No.: US 9,395,910 B2
(45) Date of Patent: Jul. 19, 2016

(54) INVOKING ZOOM ON TOUCH-SCREEN DEVICES

(71) Applicant: GLOBALFOUNDRIES INC., Grand Cayman (KY)

(72) Inventors: Gene L. Brown, Durham, CT (US); Brendan F. Coffey, Rhinebeck, NY (US); Christopher J. Dawson, Arlington, VA (US); Cliford V. Harris, Cedar Park, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 162 days.

(21) Appl. No.: 14/088,540

(22) Filed: Nov. 25, 2013

(65) Prior Publication Data

US 2015/0145782 A1 May 28, 2015

(51) Int. Cl.
*G06F 3/0488* (2013.01)
*G06F 3/041* (2006.01)

(52) U.S. Cl.
CPC .......... *G06F 3/04883* (2013.01); *G06F 3/0416* (2013.01); *G06F 2203/04806* (2013.01)

(58) Field of Classification Search
CPC .............................. G06F 3/0481; G06F 3/0488
See application file for complete search history.

(56) References Cited

U.S. PATENT DOCUMENTS

| | | | |
|---|---|---|---|
| 5,808,604 A | 9/1998 | Robin | |
| 7,456,649 B2 | 11/2008 | Miyazaki | |
| 8,468,469 B1 | 6/2013 | Mendis et al. | |
| 2009/0128516 A1* | 5/2009 | Rimon et al. | 345/174 |
| 2010/0232704 A1* | 9/2010 | Thorn | 382/195 |
| 2011/0022917 A1 | 1/2011 | Wang et al. | |
| 2011/0074710 A1* | 3/2011 | Weeldreyer et al. | 345/173 |
| 2013/0016129 A1 | 1/2013 | Gossweiler, III et al. | |

FOREIGN PATENT DOCUMENTS

| | | |
|---|---|---|
| EP | 2256609 | 1/2010 |
| WO | WO2008016387 | 2/2008 |

OTHER PUBLICATIONS

Burger, Neal, Single Touch Zoom Gestures on a Mobile Device, Bachelorarbeit, Bearbeitungszeitraum: May 1, 2010 bis Sep. 30, 2010, Ludwig-Maximillians-Universitat Munchen, 33 pages.
Authors: IBM; Two Finger Paradigm, an IP.com Prior Art Database Technical Disclosure, Original Publication Date: Feb. 10, 2006, IP.com No. IPCOM000133818D, 5 pages.

(Continued)

*Primary Examiner* — Shaheda Abdin
(74) *Attorney, Agent, or Firm* — Thompson Hine LLP (57) ABSTRACT

A method and system for zooming an image on a touch screen. A trajectory, which is detected, is formed by a continuous direct touching of the screen by a finger of a user, beginning at a first point on the screen initially touched by the user and ending at a second point on the screen being touched by the user. It is ascertained that the screen has been touched by being pressed by the finger at one point on the trajectory for at least a predetermined minimum period of time or that a direction pointed to by a tangent to the trajectory at the second point is at an angle with respect to a specified reference direction on the screen that is at least a predetermined minimum angle. In response to the ascertaining, an initial image on the screen is zoomed-in or zoomed-out in a manner determined by the trajectory.

20 Claims, 11 Drawing Sheets

(56) References Cited

OTHER PUBLICATIONS

Authors: Kinch, Richard John, Computer-Aided Design of Computer Architectures Using Interactive Graphic Representation, an IP.com Prior Art Database Technical Disclosure, Original Publication Date: Dec. 31, 1978, IP.com No. IPCOM000151435D, 135 pages.

Martin Bichsel, Analyzing a Scene's Picture Set under Varying Lighting, Computer Vision and Image Understanding, vol. 71, No. 3, September, pp. 271-280, 1998, Article No. IV970627.

Yoshiaki Shirai, Software Patent Institute, Image Processing for Data Capture, Original Publication Date: Nov. 1, 1982, IP.com No. 000131549, 16 pages.

Nevatia, Ramakant, Software Patent Institute, Structured Descriptions of Complex Curved Objects for Recognition and Visual Memory, Original Publication Date: Oct. 31, 1974, IP.com No. 000150595, 133 pages.

\* cited by examiner

INVOKING ZOOM ON TOUCH-SCREEN DEVICES

TECHNICAL FIELD

The present invention relates generally to zooming an image on a touch screen, and more specifically to zooming-in and zooming-out an image on the screen.

BACKGROUND

It is well known to zoom-in (enlarge) an image or zoom-out (shrink) the image on a touch screen. For example, the Apple® iPHONE® mobile device permits a user to zoom-in an image by touching the screen with two fingers and sliding the two fingers away from each other, and to zoom-out an image by touching the screen with two fingers and sliding the two fingers toward each other. Other user controls are also known to request a zoom-in or a zoom-out of an image on a touch screen.

Mendis et al. (U.S. Pat. No. 8,468,469) discloses a first user selection at a first location on a graphically-displayed object of a touch screen, and zooming-in the object centered on a point that is along a line between a first and second location. The user indicates the first and second locations on the touch-screen by a press on the touch-screen at the first location and a release within a predetermined period of time at the second location. A direction of the zooming (i.e., zoom-in or zoom-out) is determined from the relative orientation of the first location to the second location. The magnitude of the zooming is based on the distance between the first and second locations and centered at the first location.

European Patent EP2256609 discloses a mobile device capable of implementing a touch-based zooming and control method with zoom-in and zoom-out actions depending on a move event. The mobile device executes a continuous zoom-out function around a selected point in response to the progress of a continuous move down event. The touch-screen has both a touch sensor unit used to execute an input function and a display unit used to execute an output function.

Gossweiler III et al. (U.S. Publication 20130016129) discloses a computing system recognizing a touch input gesture that includes a first touch input in a first zone of a touch screen that occurs simultaneous with a second touch input in a second zone of the touch screen. The first and second zones of the touch screen abut a periphery of the touch screen and have been established by the computing system as being zones for causing the computing system to react to touch input in a particular manner, in contrast to at least another zone of the touch screen for which the computing system does not react to touch input in the particular manner. The computing system modifies, in response to recognizing the touch input gesture, a display of the touch screen to react in the particular manner.

World Patent WO2008016387 discloses a three-dimensional touch pad input device with a zoom-in and zoom-out capability Brooke U.S. Pat. No. 8,468,469) discloses a system and method for zooming an object through a spiral movement of a pointer. Monitoring the pointer movements determines whether a movement indicates a spiral movement. When a spiral movement is determined an object is zoomed. A clockwise spiral movement may zoom an object inwardly and a counterclockwise movement may zoom an object outwardly.

BRIEF SUMMARY

The present invention provides a method and associated system for zooming an image on a touch screen. A trajectory is detected on the screen. The trajectory is formed by a continuous direct touching of the screen by a finger of a user, the trajectory beginning at a first point on the screen initially touched by the user and ending at a second point on the screen being currently touched by the user.

It is ascertained that the screen has been touched by being pressed by the finger of the user at one point on the trajectory for at least a predetermined minimum period of time or that a direction pointed to by a tangent to the trajectory at the second point is at an angle with respect to a specified reference direction on the screen that is at least a predetermined minimum angle.

In response to the ascertaining, zooming-in or zooming-out an initial image on the screen is performed in a manner determined by the trajectory.

DETAILED DESCRIPTION

Figure 1:
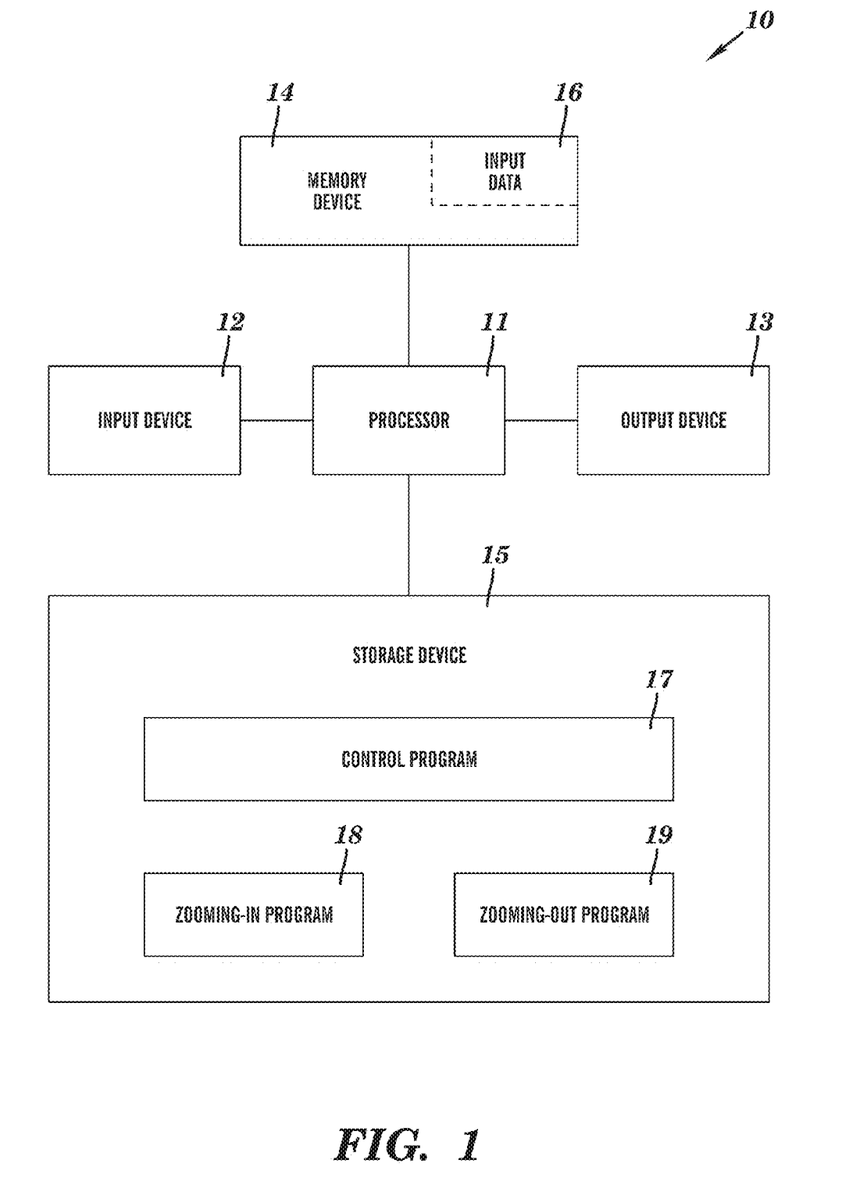
FIG. 1 depicts a computer system to zoom-in an image on a touch screen, in accordance with embodiments of the present invention.

FIG. 1 illustrates a computer system 10 for zooming an image on a touch screen, in accordance with embodiments of the present invention. The image can be alphanumeric text, graphics, a picture, or most anything else that can be displayed on the screen. The computer system 10 comprises a processor 11, an input device 12 coupled to the processor 11, an output device 13 coupled to the processor 11, a memory 14 coupled to the processor 11, and a storage device 15 each coupled to the processor 11. The input device 12 may be, inter alia, a keyboard, a mouse, etc. The output device 13 may be, inter alia, a printer, a plotter, a computer screen, a magnetic tape, a removable hard disk, a floppy disk, etc. The memory 14 may be, inter alia, random access memory (RAM). The storage device 15 may be, inter alia, a hard disk, a floppy disk, a magnetic tape, an optical storage such as a compact disc (CD) or a digital video disc (DVD), etc. The storage device 15 stores computer programs configured to be executed by the processor 11 via the memory 14 to zoom-in an image on a touch screen.

The programs include a control program 17, a zoom-in program 18, and a zoom-out program 19. The control program 17 controls implementation of the overall method for zooming an image on a touch screen. Control program 17 invokes the zoom-in program 18 in response to a user request? to enlarge an image on the touch screen. Control program 17 invokes the zoom-out program 19 in response to a user request to shrink an image on the screen.

The processor 11 executes the programs 17-19. The memory 14 may store input data 16 required by the programs 17-19. The output device 13 displays output from the programs 17-19. The storage device 15 is a tangible computer readable storage device (such as a magnetic disk or semiconductor memory), or alternatively a plurality of tangible computer readable storage devices, storing the programs 17-19 for execution by the processor 11, or alternatively by one or more processors (e.g., a plurality of processors), via the memory 14. Generally, the programs 17-19 may be stored on a single storage device or may be stored by being distributed among a plurality of storage devices in any manner known in the art. A computer program product (or, alternatively, an article of manufacture) of the computer system 10 may comprise the storage device 15, or a plurality of storage devices, storing the programs 17-19 for execution by the processor 11, or alternatively by a plurality of processors, via the memory 14. The term "computer readable storage device" does not mean a signal propagation medium such as a copper transmission cable, an optical transmission fiber, or a wireless transmission media.

While FIG. 1 shows the computer system 10 as a particular configuration of hardware and software, any configuration of hardware and software, as would be known to a person of ordinary skill in the art, may be utilized for the purposes stated supra in conjunction with the particular computer system 10 of FIG. 1.

Figure 2A:
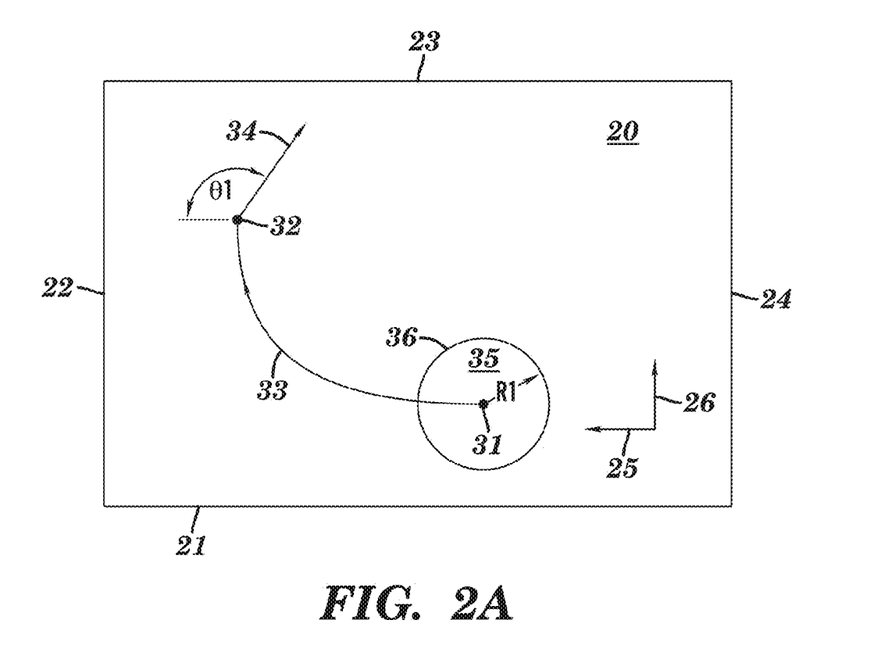
FIG. 2A depicts a touch screen in which a trajectory is formed by a continuous direct touching of the screen by a finger of a user to trigger a zoom-in of an initial image on the screen, in accordance with embodiments of the present invention.

FIG. 2A depicts a touch screen 20 in which a person has traced a trajectory 33 with his or her finger by continuous direct touching of the screen 20 to trigger a zoom-in of an initial image on the screen 20, in accordance with embodiments of the present invention. The screen 20 has a substantially or essentially rectangular shape with bounding edges 21-24. The trajectory 33 begins at a first point 31 and ends at a second point 32. The initial image on the screen is the image in the entire screen 20. A screen portion 35 of the entire screen 20 is a circle of radius R1 within a closed circular boundary 36 having the first point 31 at its radial center. The first point 31 is at a center or centroid of the screen portion 35. Reference directions 25 and 26 define mutually orthogonal axes oriented parallel to the edges 21 and 22, respectively. The direction 34 is the direction pointed to by a tangent to the trajectory 33 at the second point 32. The trajectory is "forming" as it continues to lengthen and is "fully formed" when it stops growing and is static. Thus, the second point 32 is a dynamically changing point on the screen 20 and denotes the spatial location of the user's finger as the finger move on the screen 20 to generate the trajectory. When the trajectory is fully formed and stops growing, the second point 32 is where the user's finger has stopped moving.

The zoom-in is to be performed as an outward magnification of the image from the first point 31 and will result in a truncated image in which portions of the initial image closest to the edges 21-24 are cropped in the zoomed-in image.

In FIG. 2A, the trajectory 33 has been formed by clockwise motion from the first point 31 to the second point 32, and in one embodiment, the clockwise motion selects zoom-in rather than the zoom-out. In another embodiment, a counter-clockwise motion from the first point 31 to the second point 32 would select the zoom-in rather than the zoom-out.

In one embodiment, the user selects zoom-in from a menu on the screen (e.g., a popup menu).

Figure 2B:
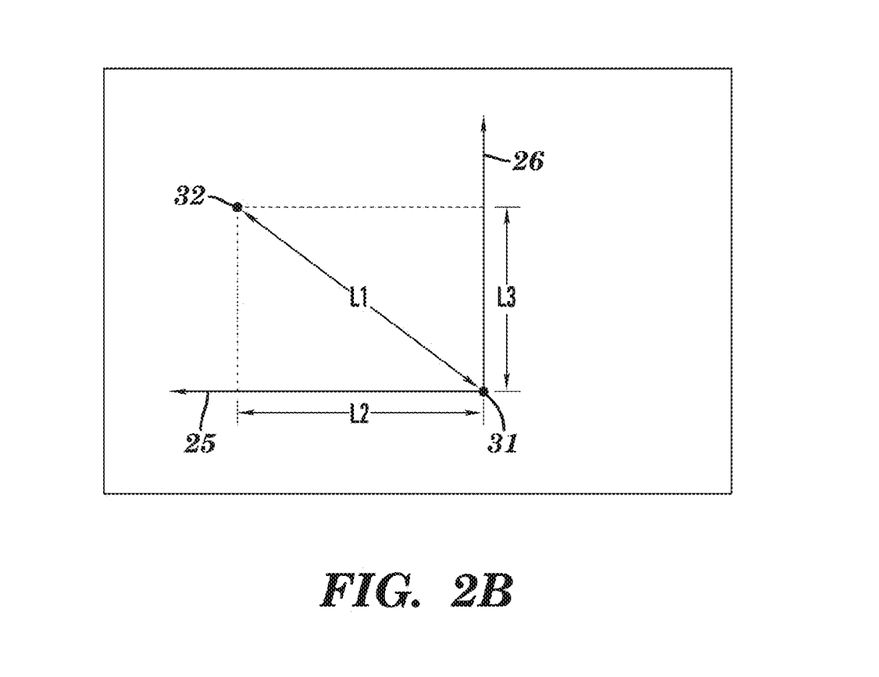
FIG. 2B depicts various straight lines segments defined by the trajectory of FIG. 2A, in accordance with embodiments of the present invention.

FIG. 2B depicts various straight lines segments defined by the trajectory 33 of FIG. 2A, in accordance with embodiments of the present invention. Line L1 is a straight line segment between the first point 31 and the second point 32. Line L2 is a straight line segment formed by projecting line L1 onto the axis defined by the direction 25. Line L3 is a straight line segment formed by projecting line L1 onto the axis defined by the direction 26.

Although the clockwise motion from the first point 31 to the second point 32 selects the zoom-in in one embodiment, the zoom-in is not initiated until a condition for initiation of the zoom-in is satisfied.

In one embodiment, the condition for initiation of the zoom-in is that the screen 20 has been touched by being pressed by the finger of the user at one point on the trajectory 33 for at least a first predetermined minimum period of time. The one point on the trajectory 33 that is pressed for at least the first predetermined minimum period of time is any point on the trajectory 33 (e.g., the first point 31, the second point 32, or any point on the trajectory 33 between the first point 31 and the second point 32).

In one embodiment, the condition for initiation of the zoom-in is that the direction 34 pointed to by the tangent to the trajectory 33 at the second point 32 is at an angle with respect to a specified reference direction (e.g., reference direction 25 or reference direction 26) on the screen that is at least a predetermined minimum angle. In FIG. 2A, the angle θ1 of the direction 34 pointed to by the tangent to the trajectory 33 at the second point 32 is with respect to the reference direction 25. The predetermined minimum angle may be any specified angle (e.g., 45 degrees, 60 degrees, 70 degrees, 90 degrees, 120 degrees, 140 degrees, 165 degrees, 180 degrees, 215 degrees, 250 degrees, 270 degrees, etc.).

Figure 3:
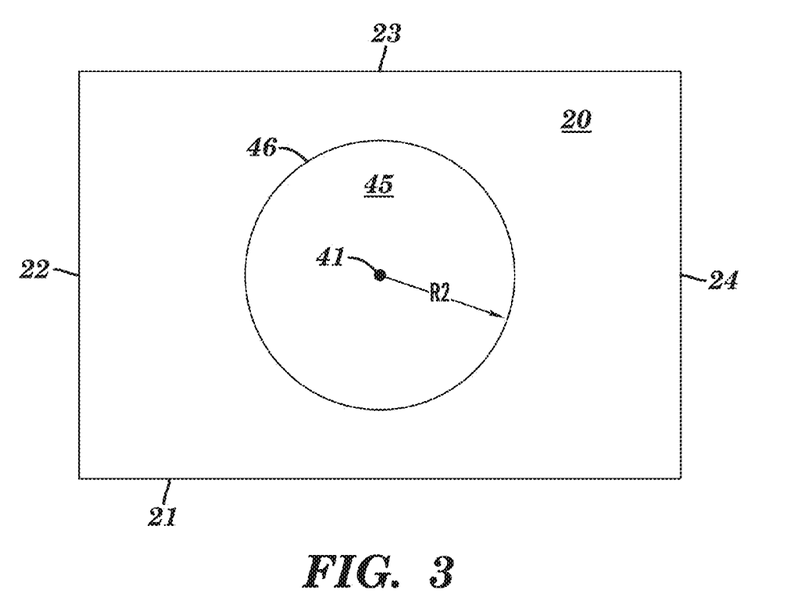
FIG. 3 depicts the touch screen of FIG. 2A with a zoomed-in image, in accordance with embodiments of the present invention.

FIG. 3 depicts the touch screen of FIG. 2A with the zoomed-in image, in accordance with embodiments of the present invention. The zoom-in is characterized by an isotropic (i.e., spatially uniform) magnification of the initial image respect to the first point 31.

In FIG. 3, the first point 31 of FIG. 2A has been mapped into point 41 which is at a geometric center of the screen 20. The screen portion 35 within the closed circular boundary 36 of FIG. 2A has been mapped into the screen portion 45 within the closed circular boundary 46. The screen portion 45 is a circle of radius R2 within the closed circular boundary 46 having the point 41 at its radial center, wherein R2 exceeds R1. Although point 41 is at the geometric center of the screen 20 in the embodiment illustrated by FIG. 3, in another embodiment point 41, which is mapped from the first point 31, may remain at the spatial location of the first point 31.

The magnification of the initial image by the zoom-in from the first point 31 has a magnification factor (MF) equal to R2/R1.

The magnification of the initial image accompanying the zoom-in from the first point 31 has an associated magnification factor (MF). The zoom-in scales up each linear dimension of the initial image via multiplication of each linear dimension by the magnification factor (MF). The magnification factor exceeds 1.

In an alternative embodiment, the magnification factor (MF) is a predetermined magnification factor.

In one embodiment in conjunction with the line segments depicted in FIG. 2B, the magnification factor (MF) may be determined by computing a length (S1) of (i) a straight line segment between the first point 31 and the second point 32 (e.g., line segment L1), (ii) a projection of the straight line segment L1 on a line passing through the first point 31 and oriented in the reference direction 25 (e.g., line segment L2), or (iii) projection of the straight line segment L1 on a line passing through the first point 31 and oriented perpendicular to the reference direction in direction 26 (e.g., line segment L3). Then, the initial image is magnified, in accordance with the zoom-in, by a magnification factor (MF) that is a monotonically increasing function of the computed length.

In one embodiment, the magnification factor (MF) may be a linearly increasing function of the computed length.

In one embodiment, the magnification factor (MF) may be a nonlinearly increasing function of the computed length. For example, MF may vary as $(S1)^K$ (K=0.5, 2, 3, etc.), or as $\exp(a(S1))$ (a>0), etc.

Since the position of the second point 32 on the screen 20 dynamically changes as the trajectory 33 is being formed, the magnification factor (MF) may likewise dynamically change as the trajectory 33 is being formed.

Figure 4A:
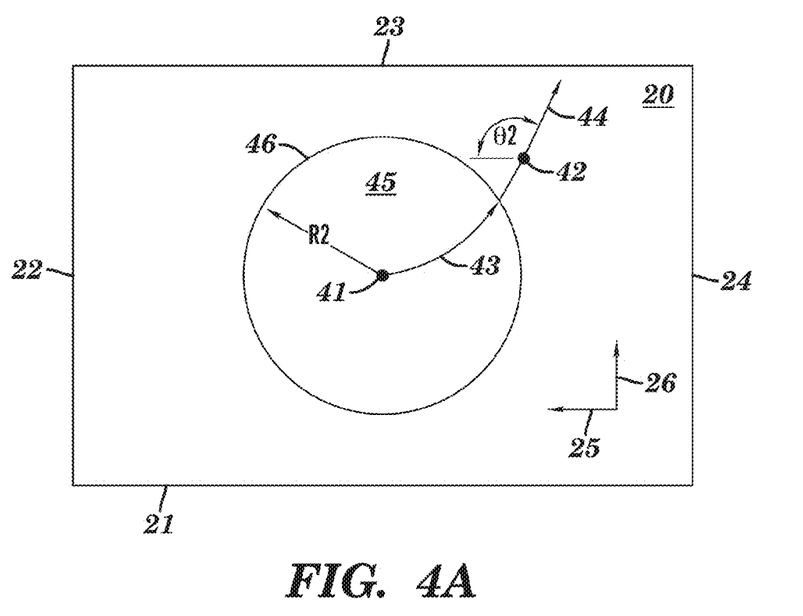
FIG. 4A depicts the touch screen of FIG. 3 in which a trajectory is formed by a continuous direct touching of the screen by the finger of the user to trigger a zoom-out of the zoomed-in image in FIG. 3, in accordance with embodiments of the present invention.

FIG. 4A depicts the touch screen 20 of FIG. 3 in which a trajectory 43 is formed by a continuous direct touching of the screen 20 by the finger of the user to trigger a zoom-out of the zoomed-in image in FIG. 3, in accordance with embodiments of the present invention.

The trajectory 43 begins at the first point 41 and ends at the second point 42. Although the first point 41 in FIG. 4A is depicted as the same point 41 in the zoomed-in image of FIG. 3, in practice the user may place the user's finger initially at any arbitrary point in the screen 20 with respect to the zoom-out, and this initial arbitrary point will be automatically relocated to point 41 of FIG. 3 because the zoom-out is required to be performed as a partial or full reversal of the zoomed-in image of FIG. 3. Thus for simplicity, FIG. 4 depicts this initial arbitrary point as being at the same point 41 of FIG. 3.

The initial image for the zoom-out is the entire screen 20 of FIG. 4A. In FIG. 4A, the screen portion 45 of the entire screen 20 is a circle of radius R2 within a closed circular boundary 46 having the point 41 at its radial center as FIG. 3. The first point 41 is at the center or centroid of the screen portion 45. The direction 44 is the direction pointed to by a tangent to the trajectory 43 at the second point 42.

The zoom-out is to be performed as a demagnification of the zoomed-in image of FIG. 3 and may restore portions of the initial image of FIG. 2A that were cropped to form the zoomed-in image of FIG. 3.

In FIG. 4A, the trajectory 43 has been formed by a counterclockwise motion from the first point 41 to the second point 42, and in one embodiment, the counterclockwise motion selects the zoom-out rather than the zoom-in. In another embodiment, clockwise motion from the first point 41 to the second point 42 would select the zoom-out rather than the zoom-in.

In an alternative embodiment, the user selects the zoom-out from a menu on the screen (e.g., a popup menu).

Figure 4B:
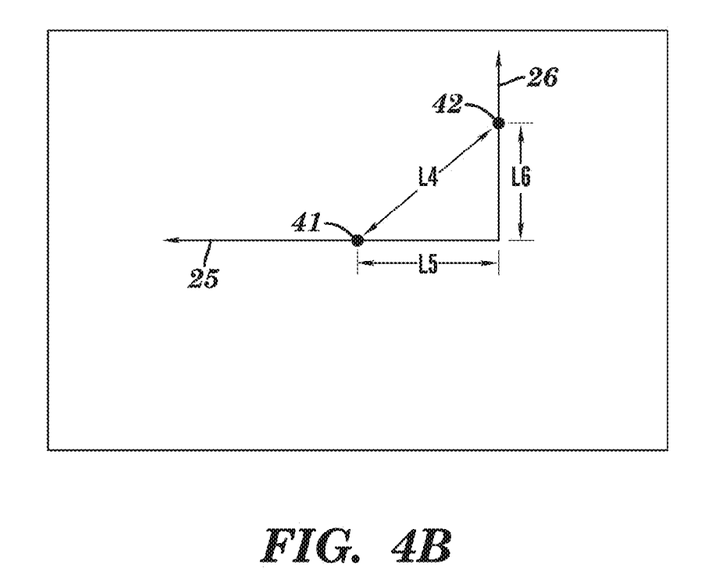
FIG. 4B depicts various straight lines segments defined by the trajectory of FIG. 4A, in accordance with embodiments of the present invention.

FIG. 4B depicts various straight lines segments defined by the trajectory 43 of FIG. 4A, in accordance with embodiments of the present invention. Line L4 is a straight line segment between the first point 41 and the second point 42. Line L5 is a straight line segment formed by projecting line L4 onto the axis defined by the direction 25. Line L6 is a straight line segment formed by projecting line L4 onto the axis defined by the direction 26.

Although the counterclockwise motion from the first point 41 to the second point 42 selects the zoom-out in one embodiment, the zoom-out is not initiated until a condition for initiation of the zoom-out is satisfied.

In one embodiment, the condition for initiation of the zoom-out is that the screen 20 has been touched by being pressed by the finger of the user at one point on the trajectory 43 for at least a second predetermined minimum period of time. The one point on the trajectory 43 that is pressed for at least the second predetermined minimum period of time is any point on the trajectory (e.g., the first point 41, the second point 42, or any point on the trajectory 43 between the first point 41 and the second point 42).

In one embodiment, the condition for initiation of the zoom-out is that the direction 44 pointed to by the tangent to the trajectory 43 at the second point 42 is at an angle with respect to a specified reference direction (e.g., reference direction 25 or reference direction 26) on the screen that is at least a predetermined minimum angle. In FIG. 4A, the angle θ2 of the direction 44 pointed to by the tangent to the trajectory 43 at the second point 42 is with respect to the reference direction 25. The predetermined minimum angle may be any specified angle (e.g., 45 degrees, 60 degrees, 70 degrees, 90 degrees, 120 degrees, 140 degrees, 165 degrees, 180 degrees, 215 degrees, 250 degrees, 270 degrees, etc.).

Figure 5:
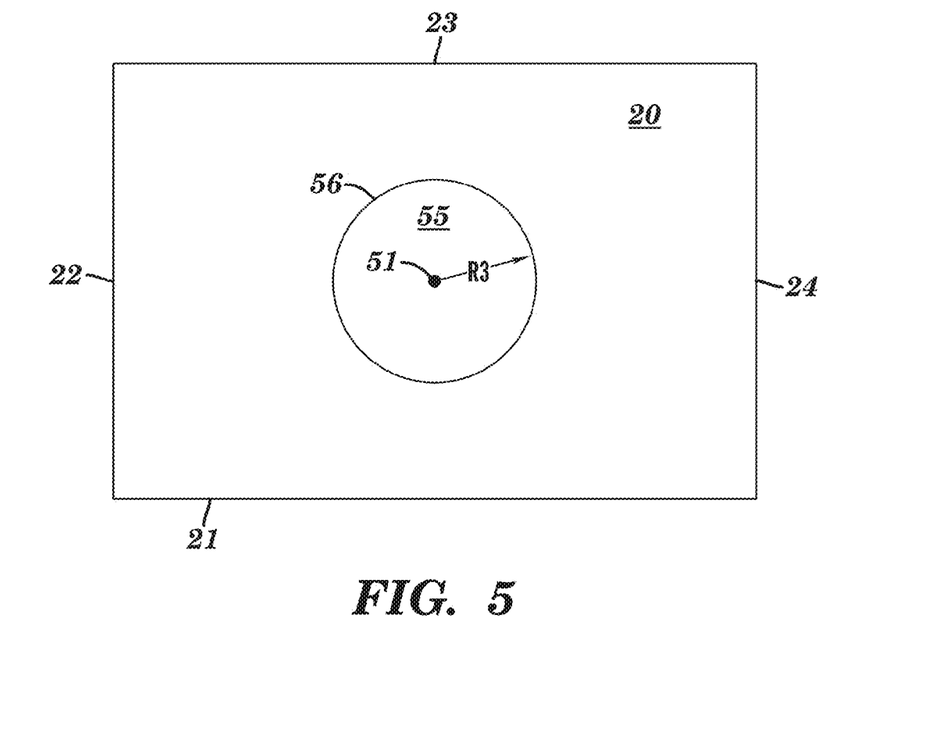
FIG. 5 depicts the touch screen of FIG. 4A with the zoomed-out image, in accordance with embodiments of the present invention.

FIG. 5 depicts the touch screen 20 with the zoomed-out image, in accordance with embodiments of the present invention. The zoom-out is characterized by an isotropic (i.e., spatially uniform) demagnification of the zoomed-in image respect to the first point 41.

In FIG. 5, the first point 41 of FIG. 4A has been mapped into point 51 which is located at the first point 31 of FIG. 2A. The screen portion 45 within the closed circular boundary 46 of FIG. 4A has been mapped into the screen portion 55 within the closed circular boundary 56 in FIG. 5. The screen portion 55 is a circle of radius R3 within the closed circular boundary 56 having the point 51 at its radial center. R3 is in a range of R1≤R3<R2.

The demagnification of the zoomed-in image accompanying the zoom-out from the first point 51 has an associated demagnification factor (DF) which is a fraction (R3/R2) of the initial image of FIG. 2A from which the zoomed-in image was formed. The zoom-out scales down each linear dimension of the zoomed-in image via multiplication of each linear dimension by the demagnification factor (DF). The demagnification factor (DF) is in the range of R1/R2≤DF<1 or equivalently 1/MF≤DF<1. Thus, a lower bound for the demagnification factor (DF) is 1/MF, since the demagnified zoomed-in image cannot be smaller than the original image of the screen 20 in FIG. 2A.

In one embodiment, the demagnification factor (DF) is a predetermined magnification factor.

In one embodiment in conjunction with the line segments depicted in FIG. 4B, the demagnification factor (DF) may be determined by: computing a length (S2) of (i) a straight line segment between the first point 41 and the second point 42 (e.g., line segment L4), (ii) a projection of the straight line segment on a line passing through the first point 41 and oriented in the reference direction 25 (e.g., line segment L5), or (iii) projection of the straight line segment on a line passing through the first point 41 and oriented perpendicular to the reference direction 26 (e.g., line segment L6). Then, the zoomed-in image is demagnified, in accordance with the zoom-out, by a demagnification factor (DF) that is a monotonically increasing function of the computed length.

In one embodiment, the demagnification factor (DF) may be a linearly increasing function of the computed length.

In one embodiment, the demagnification factor (DF) may be a nonlinearly increasing function of the computed length. For example, DF may vary as $(S2)^K$ (K=0.5, 2, 3, etc.), or as $\exp(a(S2))$ (a>0), etc.

Since the position of the second point 42 on the screen 20 dynamically changes as the trajectory 43 is being formed, the demagnification factor (DF) may likewise dynamically change as the trajectory 43 is being formed.

Figure 6A:
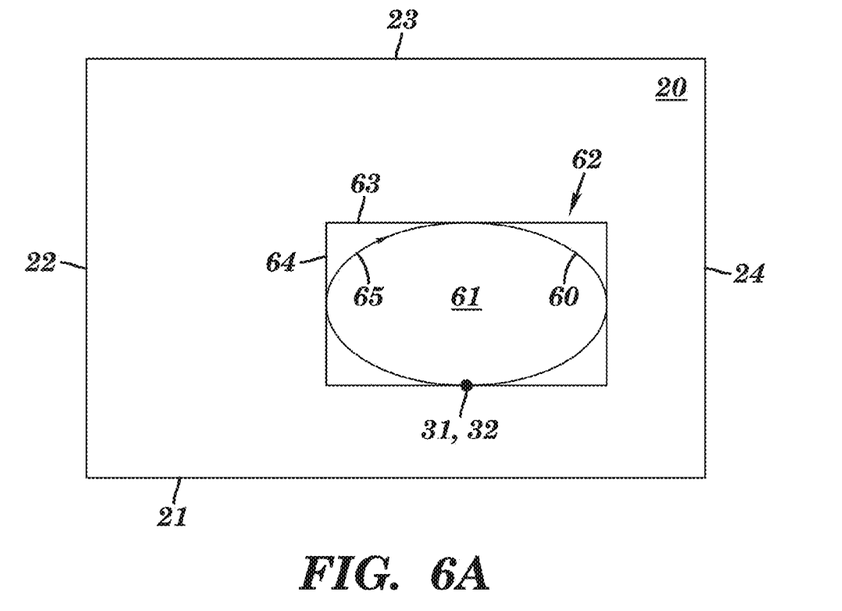
FIG. 6A depicts the touch screen of FIG. 2A in which the fully formed trajectory is a closed curve, in accordance with embodiments of the present invention.

FIG. 6A depicts the touch screen 20 of FIG. 2A in which the fully formed trajectory 33 is a closed curve 60, in accordance with embodiments of the present invention. The closed curve 60 is characterized by a coinciding of the first point 31 and the second point 32. The closed curve 60 defines a region 61 bound by, and interior to, the closed curve 33. Also depicted in FIG. 6A is a smallest rectangular box 62 whose sides 63 and 64 are exterior to the region 61 and are parallel to the bounding edges 21 and 22, respectively, of the screen 20.

In FIG. 6A, the trajectory of the closed curve 60 has been formed by clockwise motion from the first point 31 to the second point 32 as shown by the directional arrow 65, and in one embodiment, the clockwise motion selects the zoom-in rather than the zoom-out. In another embodiment, a counterclockwise motion from the first point 31 to the second point 32 would select the zoom-in rather than the zoom-out.

Although the clockwise motion from the first point 31 to the second point 32 selects the zoom-in in one embodiment, the zoom-in is not initiated until a condition for initiation of the zoom-in is satisfied.

In one embodiment, the user selects the zoom-in for the embodiment of FIG. 6A from a menu on the screen (e.g., a popup menu).

In one embodiment, the condition for initiation of the zoom-in is that the screen 20 has been touched by being pressed by the finger of the user at one point on the trajectory 60 for at least a first predetermined minimum period of time. The one point on the trajectory 60 that is pressed for at least the first predetermined minimum period of time is any point on the trajectory 60.

The closed curve 60, which is traced by the finger of a user, may have any geometric shape (e.g., a rectangle, an ellipse, etc.)

Figure 6B:
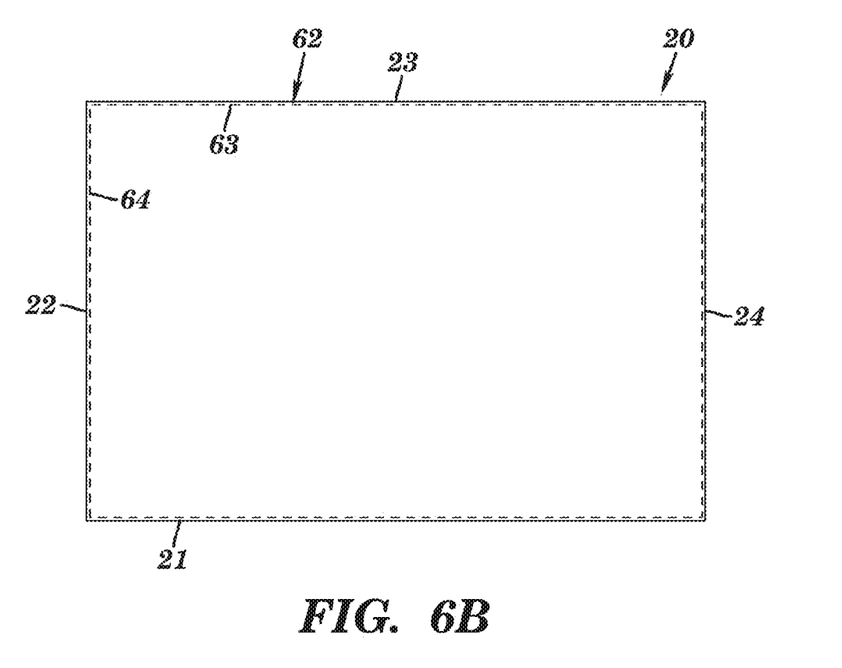
FIG. 6B depicts the touch screen of FIG. 6A in which the rectangular box is magnified to fill the screen by the zooming-out, in accordance with embodiments of the present invention.

FIG. 6B depicts the touch screen 20 of FIG. 6A in which the rectangular box 62 is magnified to become rectangular box 64 which fills the screen 20 by the zoom-in, in accordance with embodiments of the present invention.

Figure 6C:
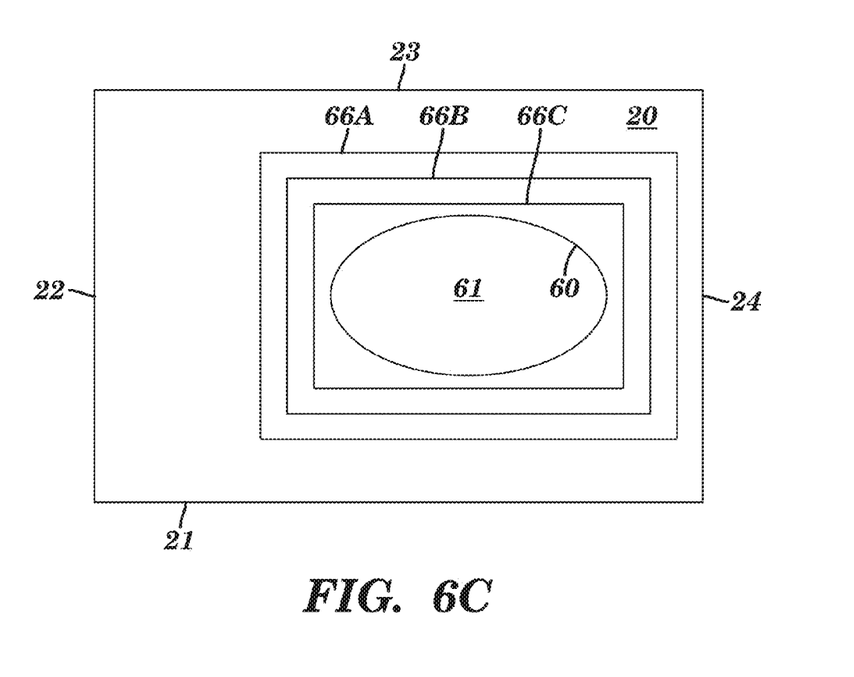
FIG. 6C depicts the touch screen of FIG. 6B with the zoomed-out image, in accordance with embodiments of the present invention.

FIG. 6C depicts the touch screen of FIG. 6B with a zoomed-out image generated from the rectangular box 64 of FIG. 6B, in accordance with embodiments of the present invention. FIG. 6C depicts different amounts of zoom-out in rectangular boxes 66A, 66B, and 66C, and finally in the closed curve 60 of FIG. 6A. The techniques described supra for zooming-out the zoomed-in image in FIG. 4A to form the zoomed-out image of FIG. 5 apply likewise to zooming-out the zoomed-in image of FIG. 6B to form the zoomed-out images of FIG. 6C.

Figure 7:
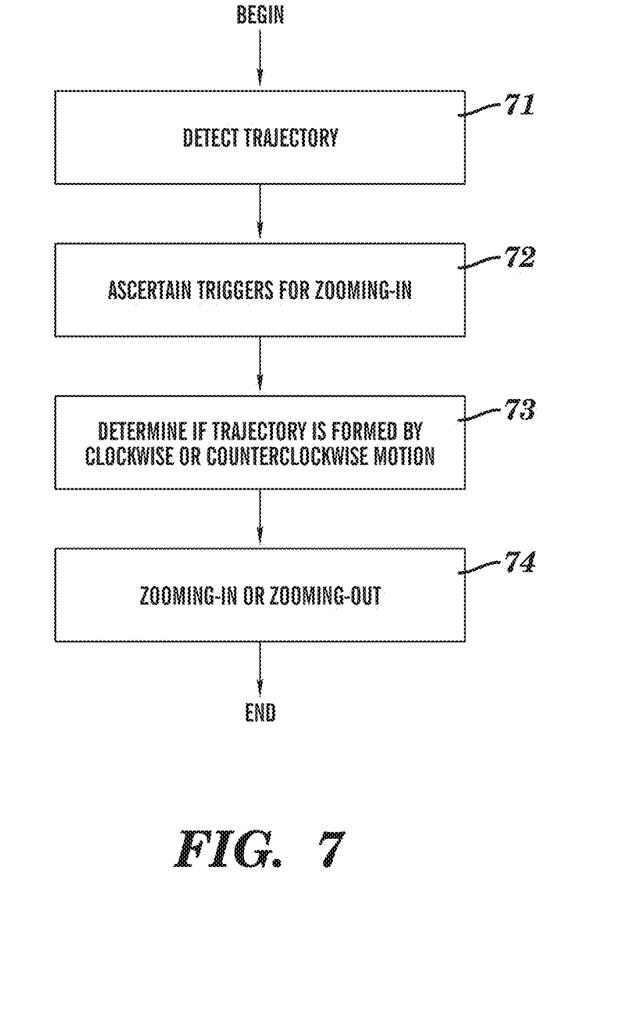
FIG. 7 is a flow chart describing a method for zooming an image on a touch screen with the zooming being a process for zooming-in or a zooming-out of the image, in accordance with embodiments of the present invention.

FIG. 7 is a flow chart describing a method for zooming an image on a touch screen with the zooming being a process for zoom-in or a zoom-out of the image, in accordance with embodiments of the present invention. The flow chart of FIG. 7 includes steps 71-74.

In step 71, the control program 17 detects a trajectory 33 on the touch screen 20 formed by a continuous direct touching of the screen 20 by a finger of a user. The trajectory 33 begins at a first point on the screen (point 31) initially touched by the user and ending at a second point (point 32) on the screen being currently touched by the user.

In step 72, the control program 17 ascertains that the screen 20 has been touched by being pressed by the finger of the user at one point on the trajectory 33 for at least a predetermined minimum period of time or that a direction pointed to by a tangent to the trajectory 20 at the second point 32 is at an angle θ1 with respect to a specified reference direction 25 or 26 on the screen that is at least a predetermined minimum angle.

In step 73, the control program 17 determines that the trajectory 33 has been formed by first or second motions. Either the first motions are clockwise motions and the second motions are counterclockwise motions, or the first motions are counterclockwise motions and the second motions are clockwise motions.

In step 74, either the zoom-in program 18 implements the zoom-in (as selected by detection of the first motion) or the zoom-out program 19 implements the zoom-out (as selected by detection of the second motion).

Figure 8A:
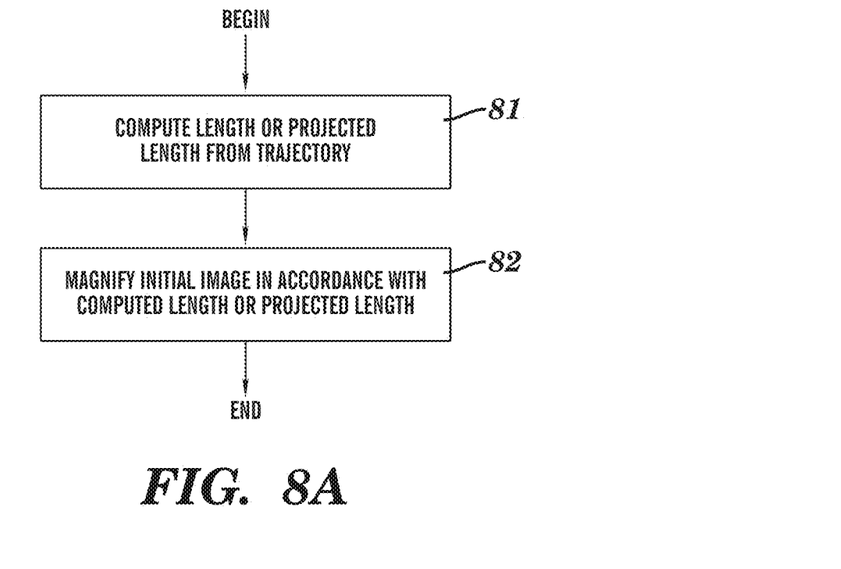
FIG. 8A is a flowchart describing a first implementation of the zoom-in process, in accordance with embodiments of the present invention.

FIG. 8A is a flowchart describing a first implementation of the zoom-in process in step 24 of FIG. 7, in accordance with embodiments of the present invention. The flow chart of FIG. 8A includes steps 81-82.

In step 81, the zoom-in program 18 computes a length of (i) a straight line segment L1 between the first point 31 and the second point 32, (ii) a projection L2 of the straight line segment L1 on a line passing through the first point 31 and oriented in the reference direction 25, or (iii) a projection L3 of the straight line segment L1 on a line passing through the first point 25 and oriented perpendicular to the reference direction (i.e., in the direction 26).

In step 82, the zoom-in program 18 magnifies the initial image for the zoom-in by a magnification factor that is a monotonically increasing function of the length computed in step 81. In one embodiment, the monotonically increasing function of the computed length is a linear function of the computed length. In one embodiment, the monotonically increasing function of the computed length is a nonlinear function of the computed length.

Figure 8B:
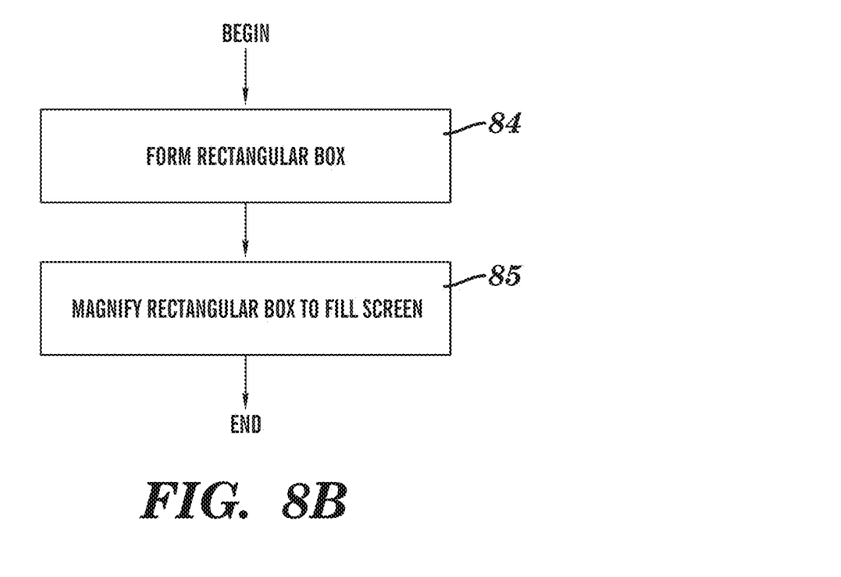
FIG. 8B is a flowchart describing a second implementation of the zoom-in process, in accordance with embodiments of the present invention.

FIG. 8B is a flowchart describing a second implementation of the zoom-in process in step 24 of FIG. 7, in accordance with embodiments of the present invention. The flow chart of FIG. 8B includes steps 84-85. For the embodiments of FIG. 8B, the screen has bounding edges 21-24, wherein the trajectory 60 is a closed curve defining a region 61 bound by, and interior to, the closed curve 60.

In step 84, the zoom-in program 18 forms a smallest rectangular box 62 whose sides are exterior to the region 61 and are parallel to the bounding edges of the screen 20.

In step 85, the zoom-in program 18 magnifies the rectangular box 62 to fill the screen 20.

Figure 9:
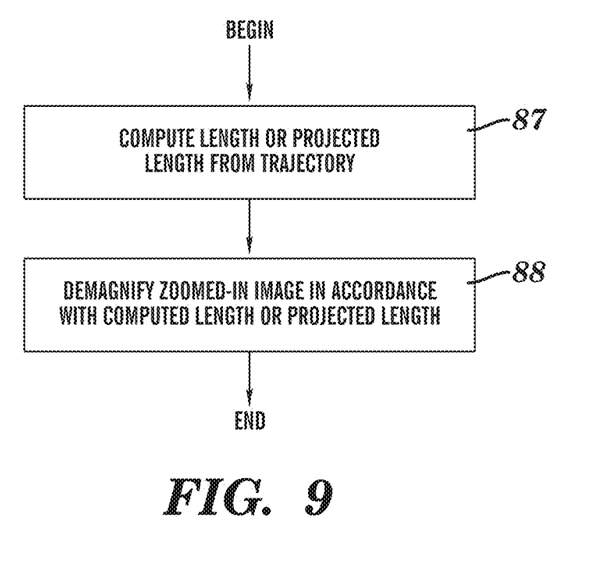
FIG. 9 is a flowchart describing the zoom-out process in FIG. 7, in accordance with embodiments of the present invention.

FIG. 9 depict flowcharts describing the zoom-out process in step 24 of FIG. 7, in accordance with embodiments of the present invention. The flow chart of FIG. 9 includes steps 87-88.

In step 88, the zoom-out program 19 computes a length of (i) a straight line segment L4 between the first point 41 and the second point 42, (ii) a projection L5 of the straight line segment L4 on a line passing through the first point 41 and oriented in the reference direction 25, or (iii) a projection L6 of the straight line segment L4 on a line passing through the first point 41 and oriented perpendicular to the reference direction 25 (i.e., in the direction 26).

Figure 10:
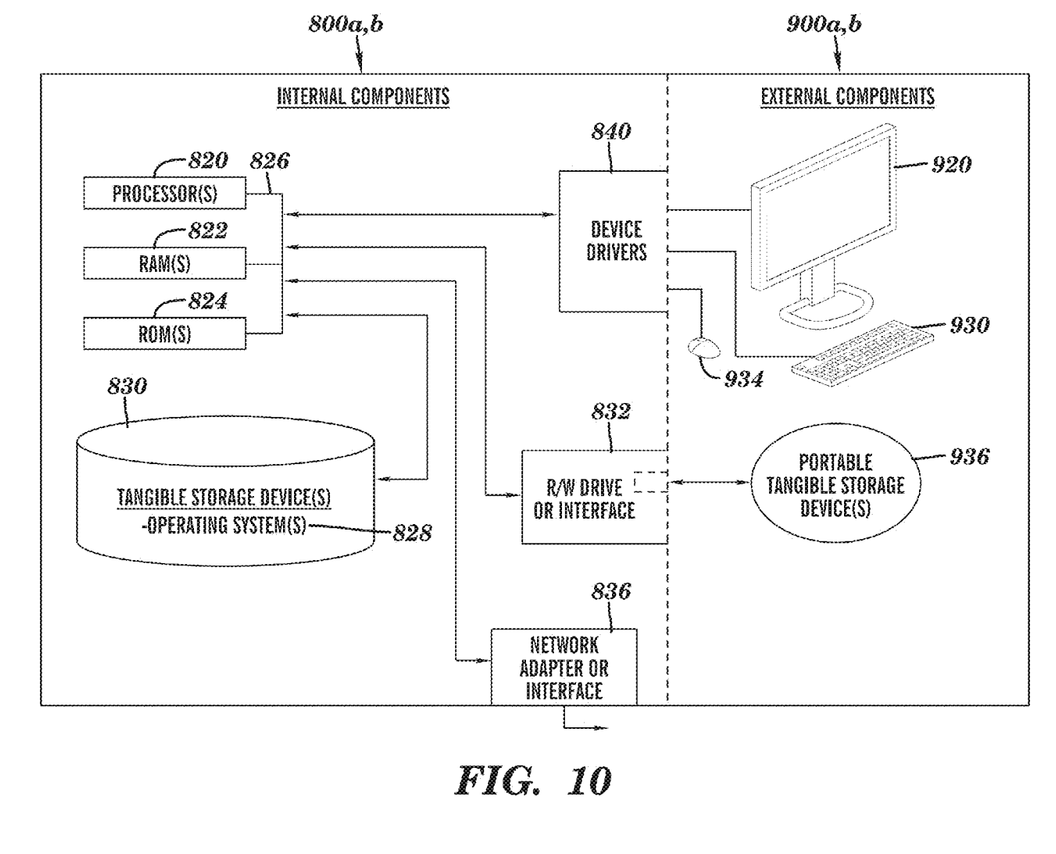
FIG. 10 illustrates a computer apparatus used by the computer system of FIG. 1 for zooming an image on a touch screen, in accordance with embodiments of the present invention.

FIG. 10 illustrates a computer apparatus 90 (e.g., computer 14 of FIG. 1) used by the computer system 10 of FIG. 1 for zooming an image on a touch screen, in accordance with embodiments of the present invention. The computer system 10 includes a set of internal components 800 and external components 900. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828 and program instructions for programs 17-19 (see FIG. 1) are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The program instructions for programs 17-19 can be stored on one or more of the respective portable computer-readable storage devices 936, read via the respective R/W drive or interface 832 and loaded into the respective hard drive or semiconductor storage device 830. The term "computer-readable storage device" does not encompass signal propagation media such as copper transmission cables, optical transmission fibers and wireless transmission media.

The set of internal components 800 also includes a network adapter or interface 836 such as a TCP/IP adapter card or wireless communication adapter (such as a 4 G wireless communication adapter using OFDMA technology). The programs instructions for programs 17-19 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

The set of external components 900 includes a display screen (i.e., touch screen) 920, a keyboard or keypad 930, and a computer mouse or touchpad 940. The sets of internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for zooming an image on a touch screen having edges, the method comprising:

detecting, by one or more processors, a trajectory on the touch screen formed by a continuous direct touching of the touch screen by a finger of a user, the trajectory beginning at a first point on the touch screen initially touched by the user and ending at a second point on the touch screen being currently touched by the user;

determining, by the one or more processors, a direction given by a tangent to the trajectory at the second point, wherein the direction is measured with respect to mutually-orthogonal axes oriented parallel to the edges of the touch screen; and in response to determining that the angle is at least equal to a predetermined minimum angle relative to the mutually-orthogonal axes, initiating, by the one or more processors, either zooming-in or zooming-out of an initial image on the touch screen based on the trajectory.

2. The method of claim 1, further comprising:

determining, by the one or more processors, that the trajectory has been formed by first or second motions and in response, performing, by one or more processors, the zooming-in or zooming-out, respectively, wherein either the first motions are clockwise motions and the second motions are counterclockwise motions, or the first motions are counterclockwise motions and the second motions are clockwise motions.

3. The method of claim 1, wherein the zooming-in or zooming-out comprises the zooming-in.

4. The method of claim 3, wherein the zooming-in is characterized by an isotropic magnification of the initial image with respect to the first point.

5. The method of claim 3, wherein the zooming-in comprises placing the first point at a geometric center of the display screen.

6. The method of claim 3, wherein the zooming-in comprises leaving the first point in an initial position on the screen where the first point was initially touched by a finger of the user.

7. The method of claim 3, wherein the zooming-in comprises magnifying the initial image for the zooming-in by a predetermined magnification factor.

8. The method of claim 3, wherein the zooming-in comprises:
computing a length of (i) a straight line segment between the first point and the second point, (ii) a projection of the straight line segment on a line passing through the first point and oriented in the reference direction, or (iii) a projection of the straight line segment on a line passing through the first point and oriented perpendicular to the reference direction; and
magnifying the initial image for the zooming-in by a magnification factor that is a monotonically increasing function of the computed length.

9. The method of claim 8, wherein the monotonically increasing function of the computed length is a linear function of the computed length.

10. The method of claim 8, wherein the monotonically increasing function of the computed length is a nonlinear function of the computed length.

11. The method of claim 8, wherein the magnification factor dynamically changes as the trajectory is being formed.

12. The method of claim 3, wherein the screen has bounding edges, wherein the trajectory is a closed curve defining a region bound by, and interior to, the closed curve, and wherein the zooming-in comprises:
forming, by one or more processors, a smallest rectangular box whose sides are exterior to the region and are parallel to the bounding edges of the screen; and
magnifying the rectangular box to fill the screen.

13. The method of claim 1, wherein the zooming-in or zooming-out comprises the zooming-out, and wherein the initial image for the zooming-out is a previously zoomed-in image.

14. The method of claim 13, wherein the zooming-out comprises demagnifying the initial image for the zooming-out by a predetermined demagnification factor, subject to the demagnified image including a fraction of the initial image from which the zoomed-in image was formed.

15. The method of claim 13, wherein the zooming-out comprises:
computing a length of (i) a straight line segment between the first point and the second point, (ii) a projection of the straight line segment on a line passing through the first point and oriented in the reference direction, or (iii) a projection of the straight line segment on a line passing through the first point and oriented perpendicular to the reference direction; and
demagnifying the initial image for the zooming-out by a demagnification factor that is a monotonically increasing function of the computed length, subject to the demagnified image being at least the initial image from which the zoomed-in image was formed.

16. The method of claim 15, wherein the monotonically increasing function of the computed length is a linear function of the computed length.

17. The method of claim 15, wherein the monotonically increasing function of the computed length is a nonlinear function of the computed length.

18. The method of claim 15, wherein the demagnification factor dynamically changes as the trajectory is being formed.

19. A computer program product for zooming an image on a touch screen, the computer program product comprising:
one or more computer-readable non-transitory storage devices and program instructions stored on at least one of the one or more non-transitory storage devices, wherein the program instructions comprise:
program instructions to detect a trajectory on the touch screen formed by a continuous direct touching of the touch screen by a finger of a user, the trajectory beginning at a first point on the touch screen initially touched by the user and ending at a second point on the touch screen being currently touched by the user;
program instructions to determine a direction given by a tangent to the trajectory at the second point, wherein the direction is measured with respect to mutually-orthogonal axes oriented parallel to the edges of the touch screen; and
program instructions to initiate either zoom-in or zoom-out, in response to determining that the angle is at least equal to a predetermined minimum angle relative to the mutually-orthogonal axes, an initial image on the touch screen based on the trajectory.

20. A computer system for zooming an image on a touch screen, the computer system comprising:
one or more processors, one or more computer-readable memories, one or more computer-readable non-transitory storage devices, and program instructions stored on the one or more non-transitory storage devices for execution by the one or more processors via the one or more memories, wherein the program instructions comprise:
program instructions to detect a trajectory on the touch screen formed by a continuous direct touching of the touch screen by a finger of a user, the trajectory beginning at a first point on the touch screen initially touched by the user and ending at a second point on the touch screen being currently touched by the user;
program instructions to determine a direction given by a tangent to the trajectory at the second point, wherein the direction is measured with respect to mutually-orthogonal axes oriented parallel to the edges of the touch screen; and
program instructions to initiate either zoom-in or zoom-out, in response to determining that the angle is at least equal to a predetermined minimum angle relative to the mutually-orthogonal axes, an initial image on the touch screen based on the trajectory.

* * * * *